United States Patent
Han

(10) Patent No.: US 10,112,812 B2
(45) Date of Patent: Oct. 30, 2018

(54) GANTRY BINARY SYNCHRONIZATION BLOCK-TYPE BRAKE

(71) Applicant: SHIJIAZHUANG WULONG BRAKE CORPORATION, Shijiazhuang (CN)

(72) Inventor: Wulin Han, Shijiazhuang (CN)

(73) Assignee: SHIJIAZHUANG WULONG BRAKE CORPORATION, Shijiazhuang, Hebei (CN)

( * ) Notice: Subject to any disclaimer, the term of this patent is extended or adjusted under 35 U.S.C. 154(b) by 58 days.

(21) Appl. No.: 14/420,202

(22) PCT Filed: Dec. 17, 2013

(86) PCT No.: PCT/CN2013/089742
§ 371 (c)(1),
(2) Date: Feb. 6, 2015

(87) PCT Pub. No.: WO2014/094608
PCT Pub. Date: Jun. 26, 2014

(65) Prior Publication Data
US 2015/0217978 A1    Aug. 6, 2015

(30) Foreign Application Priority Data

Dec. 17, 2012   (CN) .......................... 2012 1 0547467

(51) Int. Cl.
*F16D 49/16*    (2006.01)
*B66D 5/08*    (2006.01)
(Continued)

(52) U.S. Cl.
CPC ................. *B66D 5/08* (2013.01); *B66D 5/30* (2013.01); *F16D 55/2245* (2013.01); *F16D 2121/22* (2013.01)

(58) Field of Classification Search
CPC ...... F16D 49/16; F16D 59/02; F16D 2121/22; F16D 65/46
See application file for complete search history.

(56) References Cited

U.S. PATENT DOCUMENTS 1,368,336 A *   2/1921  Gysel ..................... F16D 49/16
                                                  188/171
1,739,781 A *  12/1929  Christensen ............ F16D 51/20
                                                  188/106 A
(Continued)

FOREIGN PATENT DOCUMENTS

CN       102774769       11/2012
CN       102996681        3/2013
(Continued)

*Primary Examiner* — Bradley T King
*Assistant Examiner* — Stephen M Bowes
(74) *Attorney, Agent, or Firm* — Hamre, Schumann, Mueller & Larson, P.C.

(57) ABSTRACT

The present invention is implemented by a gantry binary synchronization block-type brake, which comprises: a gantry bracket comprised by a fixedly connected door-shaped frame; braking arms arranged on both sides of the gantry bracket with lower ends of the braking arms hinged to the gantry bracket; braking shoes connected to the braking arms for frictionally braking a braking wheel; a dual brake releaser secured to the gantry bracket for pushing the two braking arms outward synchronously; braking springs provided on the gantry bracket for pushing the braking arms so as to perform normal-mode braking; and a gap adjustment mechanism for adjusting a working gap between the braking shoes and the braking wheel. According to the present invention, the security risks in an elevator tractor or crane can be eliminated, the gap adjustment approach is simple, and reliability and versatility of an operation are considerably enhanced.

9 Claims, 7 Drawing Sheets

(51) Int. Cl.
  *B66D 5/30*   (2006.01)
  *F16D 55/224*  (2006.01)
  *F16D 121/22*  (2012.01)

(56) References Cited

U.S. PATENT DOCUMENTS

| | | | | |
|---|---|---|---|---|
| 2,289,107 | A | * | 7/1942 | Eames .................. F16D 49/16 188/171 |
| 4,023,655 | A | * | 5/1977 | Anzai .................... B66D 5/08 188/162 |
| 4,306,637 | A | * | 12/1981 | Keiser .................... B66D 5/08 188/170 |
| 5,244,060 | A | * | 9/1993 | Tanaka ................... B66B 1/32 187/261 |
| 5,337,878 | A | * | 8/1994 | Mehlert ................. B66D 5/08 188/171 |
| 6,095,289 | A | * | 8/2000 | Ray ....................... B66B 5/18 188/1.11 E |
| 2008/0308360 | A1 | * | 12/2008 | Weinberger .......... B66D 5/08 187/288 |

FOREIGN PATENT DOCUMENTS

| | | | | |
|---|---|---|---|---|
| CN | 203023339 |  | 6/2013 | |
| DE | 1227736 | B * | 10/1966 | ............ F16D 49/16 |
| DE | 2726068 | A1 * | 12/1978 | ............ B66D 5/023 |
| DE | 3332334 |  | 3/1985 | |
| GB | 268296 |  | 10/1927 | |
| SU | 564693 |  | 7/1977 | |

\* cited by examiner

GANTRY BINARY SYNCHRONIZATION BLOCK-TYPE BRAKE

TECHNICAL FIELD

The present invention relates to an electromagnetic block-type brake, and in particular to a gantry binary synchronization block-type brake.

BACKGROUND

An electromagnetic block-type brake currently utilized in an elevator tractor is characterized in that a double push electromagnet on the brake is installed on the housing of the driving motor in the elevator tractor, so that motor manufacturers are required to design and manufacture a mounting platform for fixing the double push electromagnet (or an electromagnet fixing base) and reserve a fixed mounting hole in the casing of the driving motor. Therefore, manufacturers that design and fabricate double push electromagnets have to design in cooperation with motor manufacturers. Such products that are cooperatively designed and separately manufactured have special purposes and limited uses, and therefore have no versatility. Also, the driving motors or electromagnetic brakes in tractors cannot be used interchangeably with driving motors or electromagnetic block-type brakes utilized in a similar type of cranes.

An electromagnetic block-type brake used in a crane is characterized in that the brake frame is a similar four-linkage rods type movable frame. The main drawback of the movable frame is that it is very difficult to adjust the gap between the braking shoes and the braking wheel, the adjustment can not be finished by ordinary maintenance staff. Because the gap between the two braking shoes and the braking wheel cannot be easily equalized, friction linings on the two braking shoes of the brake would be worn unevenly over time, which in the severe case may cause one of the braking shoes to lose its braking effect.

An existing electromagnetic block-type brake generally includes an electromagnetic brake releaser, a braking spring, and two braking shoes. The overall electromagnetic block-type brake belongs to a braking unit. In the event of accidental breakage of the braking spring, the overall braking unit would break down and immediately lead to failure of the brake, thereby inevitably resulting in severe security accidents such as falling of the suspended hanging box or the hanged objects. In fact, all the electromagnetic block-type brakes currently used have this potential security risk, and so far no effective solution has yet been brought up in the industry.

SUMMARY

The present invention is aimed to provide a gantry binary synchronization block-type brake to solve the problem of brake failure caused by accidental failure of the braking spring and gap adjustment difficulty in electromagnetic block-type brakes.

The present invention is implemented by a gantry binary synchronization block-type brake, which comprises:

a gantry bracket comprised by a fixedly connected door-shaped frame;

braking arms arranged on two sides of the gantry bracket with lower ends of the braking arms hinged to the gantry bracket;

braking shoes connected to the braking arms for frictionally braking a braking wheel;

a dual brake releaser secured to the gantry bracket for pushing the two braking arms outward synchronously;

braking springs provided on the gantry bracket for pushing the braking arms so as to perform normal-mode braking; and a gap adjustment mechanism for adjusting a working gap between the braking shoes and the braking wheel.

The present invention further includes:

a braking pull rod extending between the braking arms, the braking springs, and the gantry bracket for providing the braking springs with a pivot point for force application.

The gantry bracket of the present invention includes two side frames, a top beam fixedly disposed on the upper ends of the two side frames, and a base connected to lower ends of the two side frames.

The side frames and the top beam are U-shaped slots with a straight edge and a flat bottom formed by folding and welding a steel plate, the bottom of U-shaped slot faces outward and the opening of U-shaped slot faces inward; a notch is defined in each of two ends of the top face of the top beam for longitudinal insertion and reception of the braking arm; a pull rod connection block is fixed to the top beam; a notch for laterally extending and receiving the braking pull rod and the braking spring is defined in the upper end of the outer side of the side frames; a base is fixedly connected to a lower end of each of the side frames. The gantry bracket has high rigidity, requires less material, needs a simple manufacturing process, can be easily assembled and disassembled, and the gap allocation on both sides of the braking wheel is easily adjustable, thereby overcoming the drawbacks of difficult assembly and precision control in hinged type gantry brackets.

In order to improve stability, a detachable positioning pull rod is provided, the detachable positioning pull rod extends and is received between the two side frames of the gantry bracket.

The lower ends of the braking arms are hinged to the side frames or the base of the gantry bracket.

A transverse spring sleeve with an open outer side is provided on the braking arm; the braking spring extends and is received in the spring sleeve; one end of the braking pull rod is restricted at the outer end of the braking spring by an end cap and a stopper plate or by an adjusting nut and a stopper plate; the other end of the braking pull rod is fixedly connected to the gantry bracket or the dual brake releaser after the other end of the braking pull rod passes through the braking spring and the spring sleeve.

A spring seat housing is provided on the top beam of the gantry bracket; the braking spring is disposed in the spring seat housing; an inner end of the braking pull rod is restricted at the inner end of the braking spring by an end cap or by an end cap and a stopper plate; an outer end of the braking pull rod is connected to the adjusting nut by a threaded connection after the outer end of the braking pull rod passes through the braking arms The gap adjustment mechanism is an adjusting screw that extends in and is fixed onto the braking arms. An inner end of the adjusting screw remains axially opposite to an adjacent push rod on the dual brake releaser.

The gap adjustment mechanism is a shaft end cap that is connected to the push rod end of the dual brake releaser by a threaded connection, with the outer end face of the shaft end cap opposite to the inner end face of the adjacent braking arm.

The dual brake releaser in the present invention can be a double push electromagnet pushing the two braking arms toward both sides synchronously to perform brake release, or alternatively two reversely installed hydraulic brake releasers or pneumatic brake releasers.

The present invention has the following advantages and positive effects:

1. A fixed gantry bracket is used as a supporting frame for the brake and a dual brake releaser is fixedly installed on the top beam of the gantry bracket. In this way, the block type brake turns into a stand-alone apparatus, thereby eliminating the need to be structurally associated with the driving motor of the tractor, and therefore no design cooperation is required between brake manufacturers and motor manufacturers, and thus independence for brake manufacturers is significantly improved. Moreover, a thrust force for brake release applied by the dual brake releaser remains in the same direction as the bracket face of the gantry bracket, so that the force exerted on the block type brake is more reasonable.

2. In designing of the brake, the block type brake can be used interchangeably between elevator tractors and cranes without any corresponding design or variation of the driving motor in the tractor, thereby achieving notably improved versatility.

3. As a fixed gantry bracket structure is utilized, the two braking arms hinged to both sides of the gantry bracket are pushed outward synchronously by the two push rods of the dual brake releaser respectively to enable brake release, and pulled back for brake application respectively by a combined braking mechanism comprised by a suit of braking pull rod and braking spring. In this way, there are two mutually independent braking units in a suit of block type brake, which form a block type brake providing binary braking. This is the essence of the present invention. As there are two suits of mutually independent braking units, in the event of accidental breakage and failure of the braking spring in one of the braking units, the other braking unit can still apply the brake and have a retaining force for brake application. As such, the hanging box suspended by an elevator tractor or the heavy objects hanged by a crane can still be braked in the suspension process without severe security accidents of falling caused by failed brakes. Therefore, potential severe security risks in existing block type brakes can be eliminated, and operation reliability is considerably enhanced.

Figure 1:
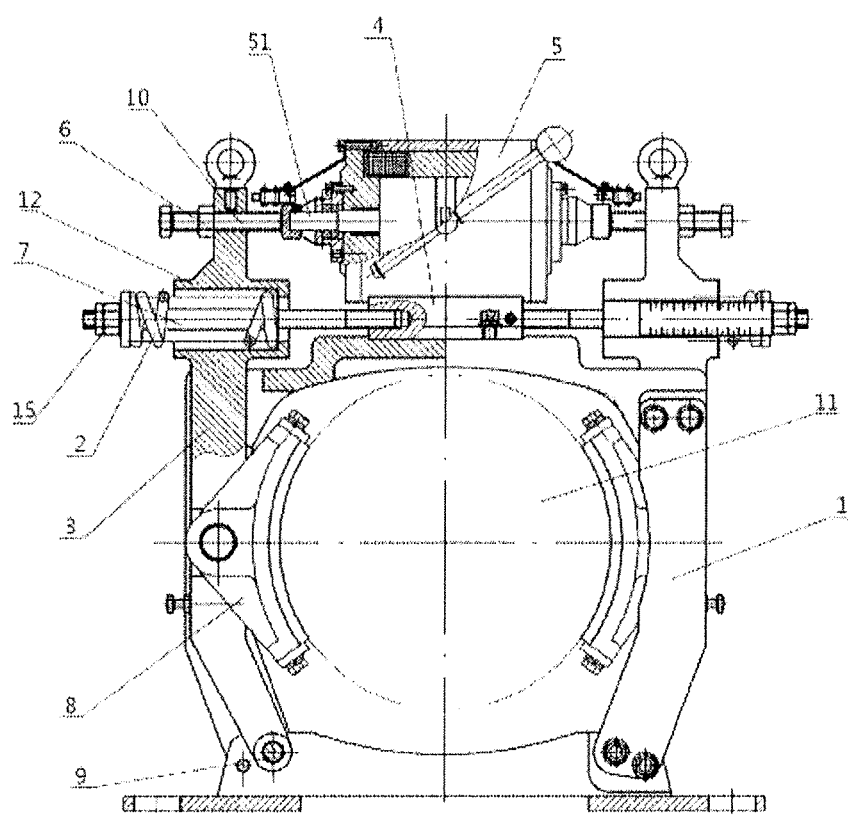
FIG. 1 and FIG. 2 are schematic structure diagrams of an external spring type binary brake.

In the figures:
1, gantry bracket
2, braking spring
3, braking arm
4, fixing base
5, double push electromagnet
51, push rod
6, locking nut
7, braking pull rod
8, braking shoe
9, hinge axle
10, adjusting screw
11, braking wheel
12, spring sleeve
13, spring seat housing
14, shaft end cap
15, adjusting nut
16, hinged shaft
17, pull rod connection block
18, passed pipe
19, connection pipe
20, fastening screw
21, ejector pin
22, pressure spring

DETAILED DESCRIPTION OF THE PREFERRED EMBODIMENTS

Embodiment 1

Figure 2:
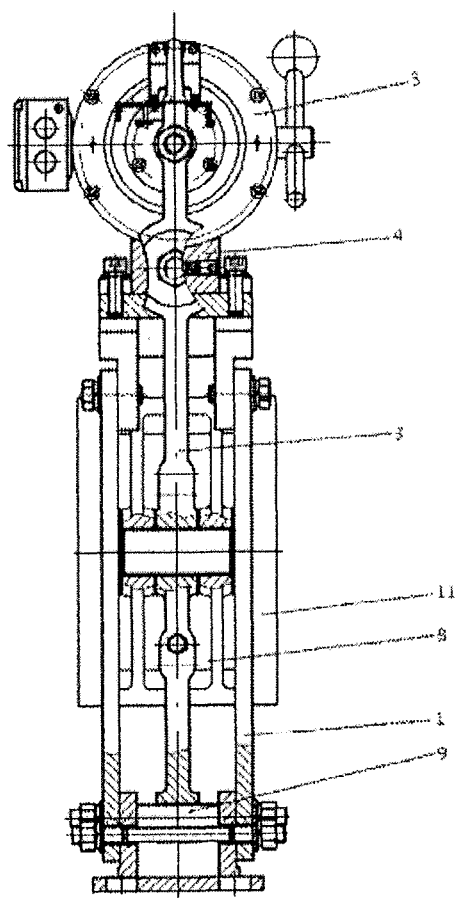

As shown in FIG. 1 and FIG. 2, a gantry bracket 1 has a rectangle frame structure consisting of two side frames, a top beam, and a base that are connected to each other. In the gantry bracket 1, the two side frames are respectively comprised by two elongated vertical plates with the plate faces opposite to each other, as shown in FIG. 2. Lower ends of the two vertical plates are fixedly connected to the base through screws, and upper ends of the two vertical plates are fixedly connected to the top beam through screws.

A braking arm 3 is connected to either side of the gantry bracket 1. The braking arms 3 are located between the two elongated vertical plates of the side frames of the gantry bracket. A hinge axle 9 passes through the lower ends of the two vertical plates of the side frames and the braking arms 3, thereby hinging the braking arms 3 with the gantry bracket 1. It is to be noted that, the braking arms 3 may alternatively be hinged to the base of the gantry bracket 1. The middle of the braking arms 3 is connected to braking shoes 8 with the shoe opening facing inward in a conventional manner, and the two braking shoes 8 have concave faces opposite to each other, so as to clamp a braking wheel 11 that is connected to a spindle of a driving motor. The upper ends of the two braking arms 3 project upward from a slot opening in the end portion of the upper end face of the top beam in the gantry bracket 1 for connecting the braking pull rods 7.

In FIG. 1, a double push electromagnet 5, is fixedly connected to the top beam of the gantry bracket 1, with a rod projecting from each end of the double push electromagnet 5, or alternatively two reversely installed hydraulic brake releasers or pneumatic brake releasers are fixedly connected to the top beam of the gantry bracket 1. For a double push electromagnet with its own fixing base, a fixing base 4 of the double push electromagnet may be directly fixed to the middle of the top beam of the gantry bracket. For a double push electromagnet without a fixing base, a positioning base is prefabricated on the top beam of the gantry bracket 1, the positioning base and the top beam may have either an integral structure or a connected structure with separate pieces, and the double push electromagnet 5 is placed on and then fixed to the positioning base. The latter arrangement is beneficial in increasing the mounting height of the double push electromagnet to facilitate mounting and fixing of the braking pull rods 7.

The braking pull rods 7 on both sides of the fixing base 4 may be formed integrally. That is, a single braking pull rod passing through the fixing base is utilized. However, the middle portion of the braking pull rod must be fixedly connected to the fixing base 4 to ensure that the two independent braking units can pull the brake separately for braking.

A transverse spring sleeve 12 with an open outer side is provided on the braking arm 3. The braking spring 2 extends in and is received by the spring sleeve 12. The inner end of the braking pull rod 7 passes through the spring sleeve 12 and the braking spring 2, and then extends in and is fixed in the positioning base of the gantry bracket 1, or alternatively extends in and is fixed in the fixing base 4 of the double push electromagnet 5. The braking spring 2 is compressed by the outer end of the braking pull rod 7 through an adjusting nut 15 threaded on the outer end, or alternatively in combination with a stopper plate. The adjusting nut 15 is used to adjust the compression degree of the braking spring 2.

Alternatively, the spring sleeve provided in the braking arm 3 may be omitted. Instead, the braking spring 2 can be directly compressed against the outer side of the braking arm 3 and then the braking arm 3 is pulled back by the braking pull rod 7. The braking pull rod may also be omitted. Instead, a spring sleeve is provided in the side frame of the gantry bracket 1 with a braking spring disposed in the spring sleeve, so as to enable normal-mode braking by directly pushing the braking arm from outside.

The gap adjustment mechanism in this embodiment are adjusting screws 10 that laterally extend in and are received by the two braking arms 3 respectively by means of threading. The adjusting screws 10 may be locked to the braking arms 3 by locking nuts 6. The inner end of each adjusting screw 10 remains axially opposite to the push rod 51 located on the same side as the double push electromagnet 5. That is, when pushed out, the push rod 51 can abut on the adjusting screw 10, thereby pushing the braking arm 3 outward, so as to disconnect the braking shoe 8 from the braking wheel 11. When retracted, the push rod 51 can be spaced from the inner end of the adjusting screw 10 by an appropriate gap, so that upon action of the braking spring 2, the braking shoe 8 on the braking arm 3 is completely pressed against the braking wheel 11 for braking. A protective cover may be additionally fitted on the end of the push rod 51 so as to protect the push rod 51.

The gap adjustment mechanism adjusts the braking working gap between the braking shoe 8 and the braking wheel 11 by adjusting the projected length of the adjusting screw from inside of the braking arm.

In particular, the adjustment is implemented by the following steps: loosening the locking nut 6, turning the adjusting screw 10 to be shifted horizontally to the right or to the left, and then tightening the locking nut 6 after the gap between the braking shoes 8 and the braking wheel 11 has been adjusted to a required level. Thus, adjustment of the working gap of the braking shoes can be achieved. The working gaps of the two braking shoes 8 can be separately adjusted, without mutual interference or influence. Furthermore, the gap adjustment approach is simple, easily operable, and very practical.

Once the double push electromagnet 5 is de-energized, the force for pushing the rod outward would disappear, and the compressed braking spring 2 relies on its own compression elasticity to expand. Under the tension of the braking spring 2, the braking arms 3 are swung the inside of the gantry bracket, so that the braking shoes 8 are pressed against the braking wheel 11 to implement a clasping brake of the block type brake which also can be called "brake application". When the double push electromagnet 5 is energized to be clasped by absorption, the rods 51 on both sides are pushed outward simultaneously to push the two adjusting screws 10, so that the two braking arms 3 are swung to the outer side of the gantry bracket 1, so as to disconnect the braking shoes 8 from the braking wheel 11, thereby achieving brake release operation of the block type brake which can be called "brake opening".

Embodiment 2

Figure 3:
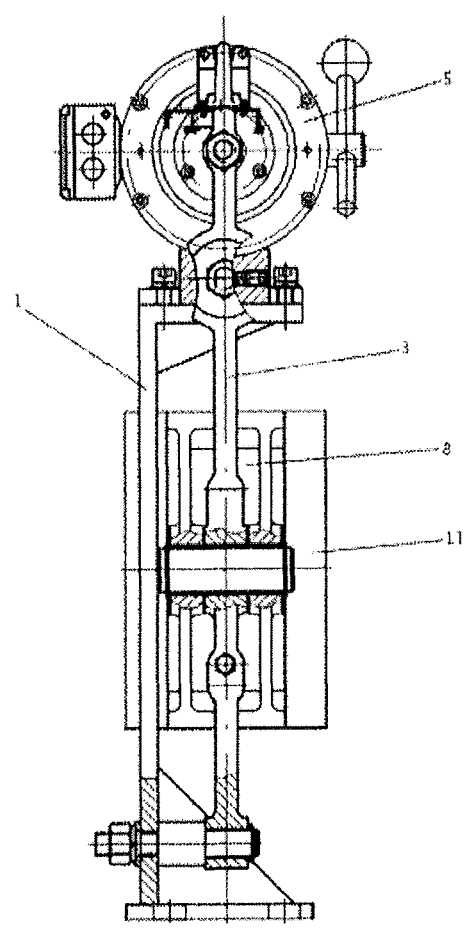
FIG. 3 is a schematic structure diagram of a binary brake, wherein the gantry bracket has a single plate with folded faces.

As shown in FIG. 1 and FIG. 3, this embodiment has the same basic structure as that of Embodiment 1, only the structure of the gantry bracket 1 is slightly different. In this embodiment the top beam of the gantry bracket 1 is stamped integrally with the two side frames and formed by edge folding. A base is welded to the lower end of each side frame to form a door shaped frame that is fixedly connected. A double push electromagnet 5, or alternatively a hydraulic brake releaser or a pneumatic brake releaser, is secured to the top beam of the gantry bracket 1. A braking arm 3 is hinged to each of two sides of the gantry bracket 1. A braking shoe 8 is connected to each of the braking arms 3. The two braking shoes 8 have concave faces opposite to the outer circle of the braking wheel 11. A braking pull rod 7 extends in and is received by the upper end of the two braking arms 3. A braking spring 2 disposed around the braking pull rod 7 extends in and is received by the spring sleeve 12 in the braking arms 3. The gap adjustment mechanism in this embodiment is an adjusting screw 10 that is threaded into a transverse screw hole in the braking arm 3 and locked to the braking arm 3 by a locking nut 6.

The key feature of this embodiment is that the gantry bracket is supported by a single plate with folded faces. In other words, the main body of the gantry bracket 1 is a vertical plate with a central opening, the slabs on both sides of the vertical plate form a side frame. An angled flat edge projecting forward is angularly formed on the top of the vertical plate to form a top beam, a base plate is welded on the lower edge of the vertical plate to form a base for bearing the vertical plate. In this way, the gantry bracket 1 having a structure of a single plate with folded faces is produced.

Embodiment 3

Figure 4:
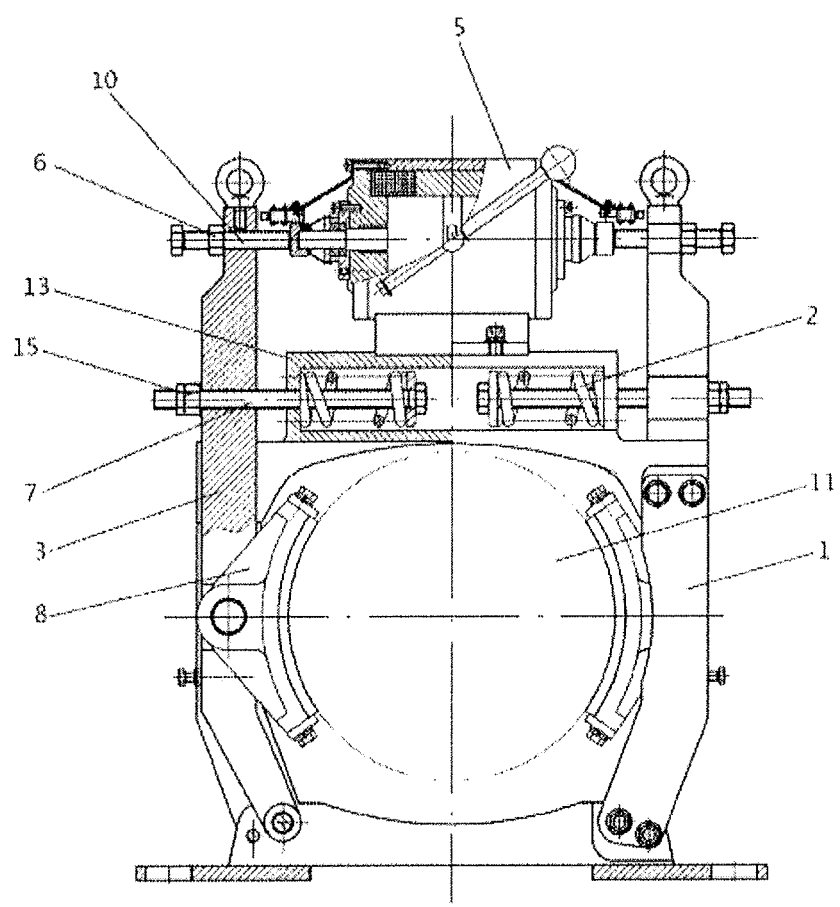
FIG. 4 and FIG. 5 are schematic structure diagrams of two kinds of internal spring type binary brake.

As shown in FIG. 4, this embodiment has the same basic structure as that of embodiment 1. That is, the gantry bracket 1 is a rectangle frame comprised by side frames, a top beam, and a base fixedly connected to each other. A double push electromagnet 5 is secured to the top beam of the gantry bracket 1. A braking arm 3 is provided in each of the two side frames of the gantry bracket 1. The lower ends of the two braking arms 3 are hinged to the base of the gantry bracket 1 respectively. A braking shoe 8 is connected to each of the two braking arms 3. The two braking shoes 8 have concave faces opposite to the outer circle of the braking wheel 11. The gap adjustment mechanism in this embodiment is an adjusting screw 10 that is threaded into a transverse screw hole in the braking arm 3 and locked to the braking arm 3 through a locking nut 6. The inner end of the adjusting screw 10 is axially opposite to the outer end face of an adjacent push rod or a protective cover of the double push electromagnet 5.

The key feature of this embodiment is that the braking spring 2 is internally disposed instead of being externally disposed. That is, the top beam of the gantry bracket 1 is provided with a spring seat housing 13. The double push electromagnet 5 is installed on the upper portion of the spring seat housing 13, and the two braking springs 2 are separately installed in the spring seat housing 13. The inner end of the braking pull rod 7 is pressed against the inner end of braking spring 2 by an end cap and a stopper plate. The outer end of the braking pull rod 7 passes through the braking spring 2, the spring seat housing 13 and the braking arm 3, and is then pressed against the outer face of the braking arm 3 through an adjusting nut 15. Thus, by means of the tension of the braking spring 2 and the pull of the braking pull rod 7, the braking arm 3 is pulled to the inside of the gantry bracket 1 to enable brake application.

Embodiment 4

Figure 5:
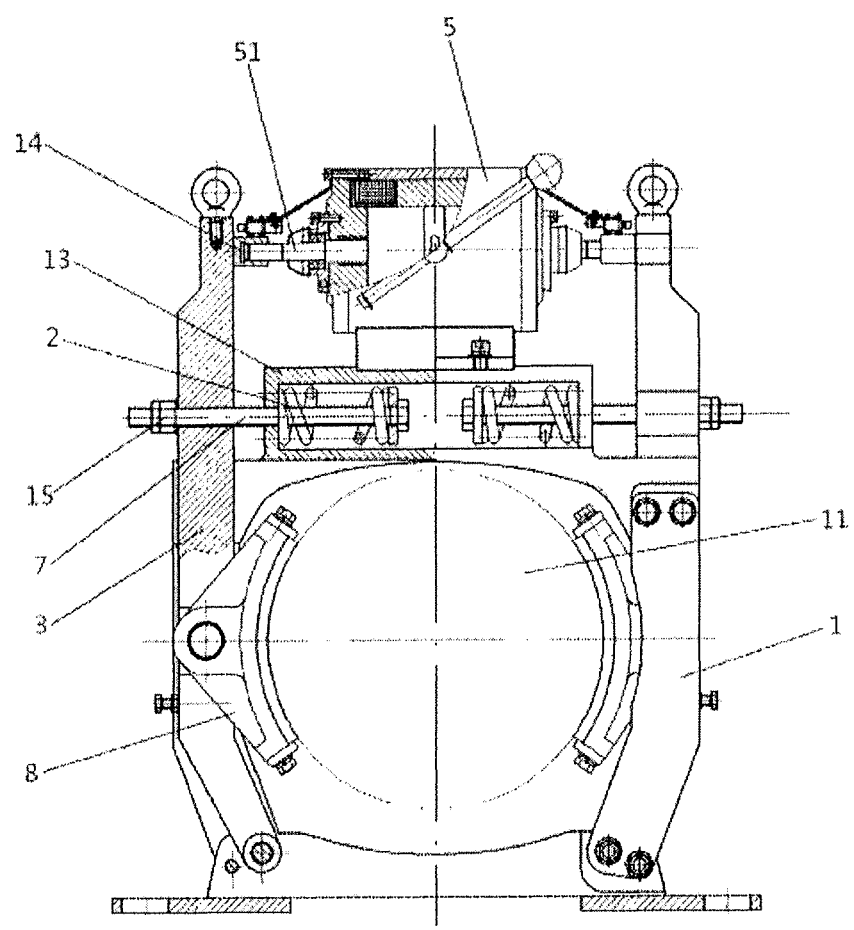

As shown in FIG. 5, this embodiment has the same basic structure as that of embodiment 3. That is, the gantry bracket 1 is a rectangle framework formed by side frames, a top beam, and a base fixedly connected to each other. A spring seat housing 13 is provided on the top beam of the gantry bracket 1 and a double push electromagnet 5 is secured to the top beam of the gantry bracket 1. A braking arm 3 is hinged to each of two sides of the gantry bracket 1. Braking shoes 8 are connected to the braking arms 3. The two braking shoes 8 have concave faces opposite to the outer circle of the braking wheel 11. Two braking springs 2 are separately installed in the spring seat housing 13. The braking pull rod 7 passes through, in turn, the braking spring 2, the side wall of the spring seat housing 13, and the through-hole in the braking arm 3 outward, so as to be restricted on the outer side of the braking arm 3 through an adjusting nut 15. One end of the braking spring 2 is pressed against the inner wall of the spring seat housing 13, and the other end of the braking spring 2 is sealed and compressed by the end cap on the braking pull rod 7 and a stopper plate.

The gap adjustment mechanism in this embodiment is a shaft end cap 14 that is threaded into the outer end portion of the push rod 51 of the double push electromagnet 5, or disposed around the outer end portion of the piston rod of a hydraulic brake releaser or a pneumatic brake releaser. The outer end face of the shaft end cap 14 abuts against the inner face of the braking arm 3 so as to enable the braking arm 3 to be pushed outward for brake release. The gap adjustment mechanism adjusts the working gap between the braking shoes and the braking wheel by adjusting the projected length of the shaft end cap 14. After gap adjustment, the shaft end cap 14 is locked in position by a fastener such as a locking nut.

Embodiment 5

Figure 6:
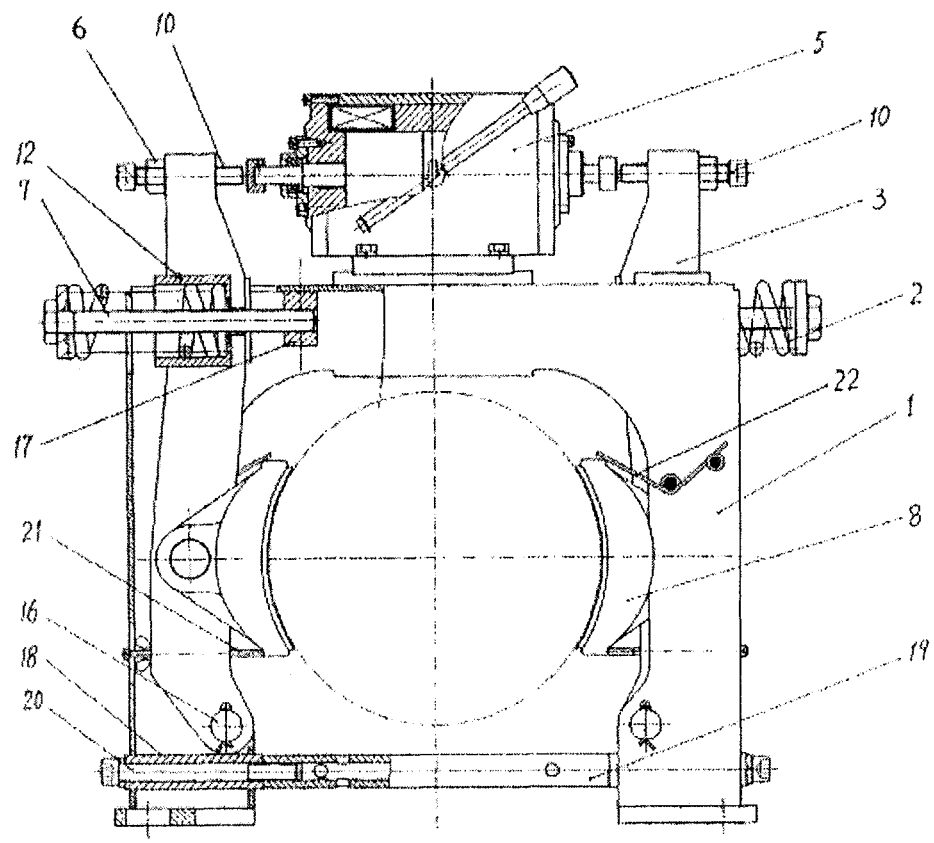
FIG. 6 and FIG. 7 are schematic structure diagrams of a binary brake, wherein the gantry bracket has a plate-frame bracket structure.
Figure 7:
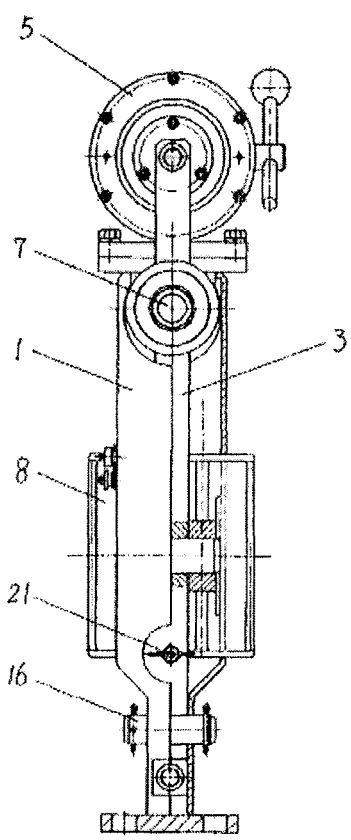

As shown in FIG. 6 and FIG. 7, the gantry bracket 1 in this embodiment is a plate-frame type door shaped bracket formed by snap fitting and welding of the edges of two door shaped plate frames with angled edges on the top face and outer face. In the gantry bracket 1, the side frames and the top beam form a U shaped slot structure with a straight edge and a flat bottom respectively, the slot bottom of the U shaped slot structure faces outward and the slot opening faces inward. That is, both of the inner faces of the two side frames are opening edges of the U shaped slot to facilitate arrangement of the braking arm 3 and installation of the braking shoe 8. The bottom face of the top beam is the opening edge of the U shaped slot to facilitate arrangement of the pull rod connection block 17. A notch is defined in each of two ends of the top face of the top beam for longitudinal insertion and reception of the braking arms 3. A notch is defined in the upper end of the outer side of the side frames, the braking pull rod 7 and the braking spring 2 can extends and be received in the notch. Two adjacent notches may also be in communication with each other so as to form an angled opening. A base is welded on the lower end of each of the two side frames so that the brake can be installed and positioned on an apparatus or in an engine room. A fixing base is welded on the top beam of the gantry bracket 1 to fixedly connect the double push electromagnet 5 or a hydraulic brake releaser or a pneumatic brake releaser. A braking arm 3 extends and is received in each of the two side frames. The lower ends of the two braking arms 3 are respectively hinged to the lower portions of the side frames through a hinged shaft 16. The middle of the braking arms 3 is connected with the braking shoes 8. The two braking shoes 8 have concave faces opposite to the outer circle of the braking wheel. The upper ends of the two braking arms 3 pass through the notch in the top beam of the bracket respectively. The upper ends of the braking arms 3 are provided with transverse screw holes, and the adjusting screws 10 used as the gap adjustment mechanism are threaded into the transverse screw holes in the braking arms 3 and locked to the braking arms 3 by locking nuts 6. The inner end of the adjusting screw 10 is axially opposite to the outer end face of an adjacent push rod on the same side as the double push electromagnet 5. A pull rod connection block 17 is welded on the inner side of the top beam of the gantry bracket 1, and a transverse screw hole is defined in the pull rod connection block 17. The upper portions of the two braking arms 3 are respectively provided with a transverse spring sleeve 12 that has an open outer side, and the braking spring 2 passes through the spring sleeve 12. The braking pull rod 7 passes through the braking spring 2 and the spring sleeve 12 of the braking arm 3 from outside, and is then threaded to the pull rod connection block 17 inside the top beam. The outer end of the braking pull rod 7 is pressed against the outer end of the braking spring 2 through an end cap and a stopper plate, so as to form a braking mechanism for pulling the braking arms 3 to close the brake.

In order to increase the stability and supporting strength of the gantry bracket and also facilitate installation of the brake, a detachable positioning pull rod passes between the two side frames of the gantry bracket 1. The positioning pull rod includes two passed pipes 18 and a connection pipe 19. Particularly, a transverse passed pipe 18 is welded on each side frame, the connection pipe 19 is provided between the two passed pipes 18, internal threads are lathed on both ends of the connection pipe 19, and a fastening screw 20 passes through the external ends of the two passed pipes 18 respectively to be threaded into the ends of the connection pipe 19, so as to form an integral positioning pull rod.

Each side frame is provided with an angled pressure spring 22 that presses an upper corner of the braking shoe from top. An ejector pin 21 is threaded into the braking arm 3. The inner end of the ejector pin 21 is pressed against a lower corner of the braking shoe 8. Thus, the overall deflection angle of the braking shoe 8 is adjusted, so that the substantially same working space is maintained between braking faces of the braking shoes and a wheel face of the braking wheel.

What is claimed is:
1. A gantry binary synchronization block brake for frictionally braking a braking wheel, comprising:
 a gantry bracket;
 a dual brake releaser secured to the gantry bracket; and
 two mutually independent braking units,
  wherein the gantry bracket further comprises two side frames, a top beam fixedly disposed on the upper ends of the two side frames, and a base connected to lower ends of the two side frames, each of the braking units comprises:
- a braking arm arranged on a side of the gantry bracket with lower end of the braking arm hinged to the gantry bracket;
- a braking shoe connected to the braking arm for frictionally braking the braking wheel;
- a braking spring provided on the braking arm for pushing the braking arm so as to brake the braking wheel; and
- an adjusting screw for adjusting a working gap between the braking shoe and the braking wheel;
- wherein the adjusting screw extends in and is fixed onto the braking arm, the adjusting screw is locked to the braking arm by a locking nut, an inner end of the adjusting screw remains axially opposite to an adjacent push rod on the dual brake releaser, the adjusting screw is axially movable relative to the push rod; and
- the gap adjustment mechanism adjusts a braking working gap between the braking shoe and the braking wheel by adjusting an extension length of the adjusting screw from inside of the braking arm.

2. The gantry binary synchronization block brake of claim 1, wherein each of the braking units further comprises:
a braking pull rod extending between the braking arm, the braking spring, and the gantry bracket for providing the braking spring with a pivot point for force application.

3. The gantry binary synchronization block brake of claim 2, wherein, in each of the braking units, the lower end of the braking arm is hinged to the side frame or the base of the gantry bracket.

4. The gantry binary synchronization block brake of claim 3, wherein each of the braking units further comprises a transverse spring sleeve with an open outer side is provided on the braking arm; the braking spring extends and is received in the spring sleeve; one end of the braking pull rod is restricted at the outer end of the braking spring by an end cap and a stopper plate or by an adjusting nut and a stopper plate; the other end of the braking pull rod is fixedly connected to the gantry bracket after the other end of the braking pull rod passes through the braking spring and the spring sleeve.

5. The gantry binary synchronization block brake of claim 1, wherein each of the braking units further comprises a protective cover that is fitted on an end of the push rod on the dual brake releaser.

6. The gantry binary synchronization block brake of claim 1, wherein each of the braking units further comprises a braking pull rod, wherein the braking spring is directly compressed against an outer side of the braking arm and the braking arm is pulled back by the braking pull rod.

7. The gantry binary synchronization block brake of claim 1, wherein each of the braking units further comprises a spring sleeve mounted on the braking arm, and the braking spring is disposed in the spring sleeve.

8. The gantry binary synchronization block brake of claim 1, wherein the dual brake releaser is a double push electromagnet fixedly connected to the top beam of the gantry bracket.

9. The gantry binary synchronization block brake of claim 8, wherein a positioning base is prefabricated on the top beam of the gantry bracket, the double push electromagnet is placed on and then fixed to the positioning base.

* * * * *